United States Patent
Le Goff

(10) Patent No.: US 9,631,636 B2
(45) Date of Patent: Apr. 25, 2017

(54) SHOCK-ABSORBING FAN MOTOR MOUNT WITH MOTOR COOLING

(71) Applicant: Valeo Systemes Thermiques, Le Mesnil Saint Denis (FR)

(72) Inventor: Morgan Le Goff, Epinay sur Orge (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 288 days.

(21) Appl. No.: 14/361,320

(22) PCT Filed: Nov. 14, 2012

(86) PCT No.: PCT/EP2012/072590
§ 371 (c)(1),
(2) Date: May 29, 2014

(87) PCT Pub. No.: WO2013/079322
PCT Pub. Date: Jun. 6, 2013

(65) Prior Publication Data
US 2014/0314598 A1    Oct. 23, 2014

(30) Foreign Application Priority Data

Nov. 30, 2011 (FR) .................................. 11 03644

(51) Int. Cl.
*F04B 35/04* (2006.01)
*F04D 29/58* (2006.01)
(Continued)

(52) U.S. Cl.
CPC ....... *F04D 29/5806* (2013.01); *F04D 25/082* (2013.01); *F04D 29/624* (2013.01);
(Continued)

(58) Field of Classification Search
CPC .. F04D 29/5806; F04D 29/624; F04D 29/626; F04D 29/668; F04D 25/082; H02K 5/20; H02K 5/24
See application file for complete search history.

(56) References Cited

U.S. PATENT DOCUMENTS 4,036,292 A * 7/1977 Hine, Jr. ............... F04D 29/626
165/122
5,133,617 A * 7/1992 Sokn ..................... F04D 29/626
403/343
(Continued)

FOREIGN PATENT DOCUMENTS

DE    1 025 557 B    3/1958
EP       2372166    *  5/2011
(Continued)

OTHER PUBLICATIONS

International Search Report for Application No. PCT/EP2012/072590 dated Dec. 20, 2012, 5 pages.
(Continued)

*Primary Examiner* — Charles Freay
(74) *Attorney, Agent, or Firm* — Howard & Howard Attorneys PLLC

(57) ABSTRACT

A drive motor (17) for the impeller (15) of a motor-fan unit (1), includes a base (21) having at least one cooling opening (50) for the circulation of a stream of cooling air for cooling the drive motor (17), and a receptacle (30) situated partly at least inside the base (21) and including a peripheral wall (35) forming a housing (36) to house the drive motor (17), the peripheral wall (35) including at least one cooling aperture (51) for the circulation of the stream of cooling air toward the housing (36) housing the motor. The motor mount includes at least one cooling sleeve (52) connecting the
(Continued)

Figure 1:
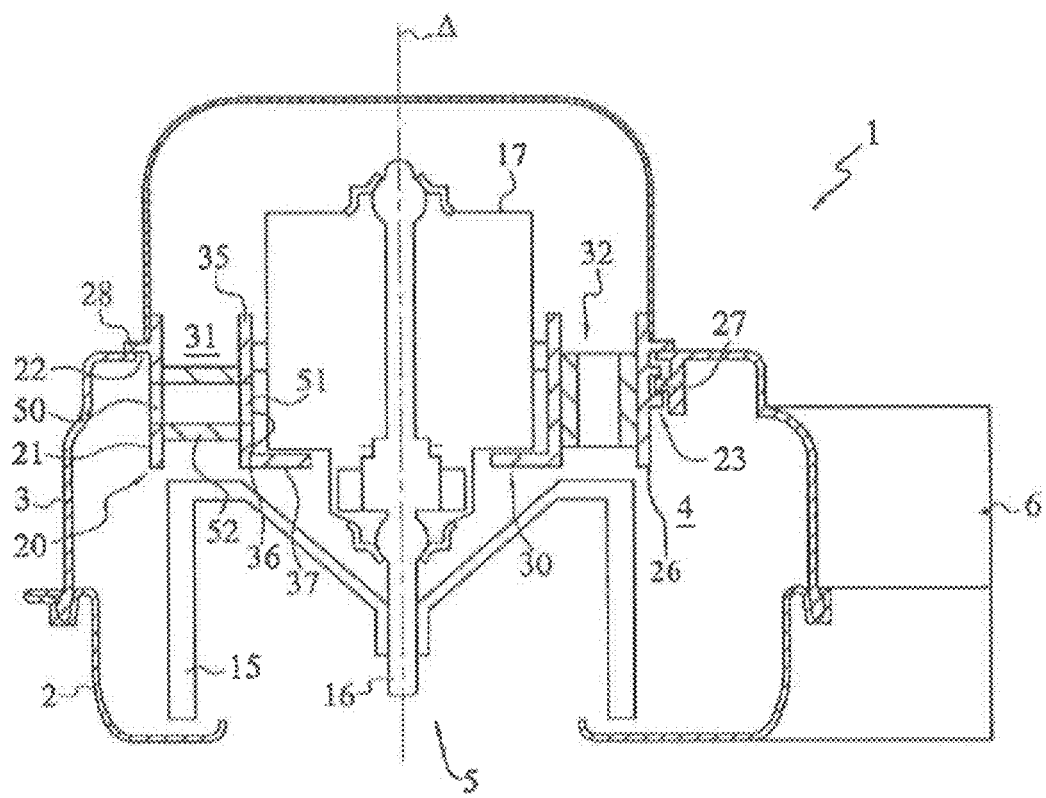

cooling opening (50) and the cooling aperture (51). A motor-fan unit incorporates such a motor mount.

13 Claims, 3 Drawing Sheets

(51) Int. Cl.
*F04D 25/08* (2006.01)
*F04D 29/66* (2006.01)
*H02K 5/20* (2006.01)
*H02K 5/24* (2006.01)
*F04D 29/62* (2006.01)

(52) U.S. Cl.
CPC ............ *F04D 29/668* (2013.01); *H02K 5/20* (2013.01); *H02K 5/24* (2013.01)

(56) References Cited

U.S. PATENT DOCUMENTS

| | | | |
|---|---|---|---|
| 6,034,451 A * | 3/2000 | El Mayas | F04D 25/082 310/58 |
| 6,802,699 B2 * | 10/2004 | Mikami | F04D 29/4226 310/62 |
| 2006/0125330 A1 * | 6/2006 | Winkler | H02K 5/24 310/51 |
| 2009/0189052 A1 * | 7/2009 | Naji | F04D 25/08 248/672 |

FOREIGN PATENT DOCUMENTS

FR     2 804 554 A1     8/2001
GB     1 031 646        6/1966

OTHER PUBLICATIONS

Machine-Assisted English translation for DE 1 025 557 extracted from the espacenet.com database on Jul. 10, 2014, 6 pages.

Machine-Assisted English language abstract and Machine-Assisted English language translation for FR 2 804 554 extracted from espacenet.com database on Jul. 10, 2014, 13 pages.

* cited by examiner

SHOCK-ABSORBING FAN MOTOR MOUNT WITH MOTOR COOLING

RELATED APPLICATIONS

This application is the National Stage of International Patent Application No. PCT/EP2012/072590, filed on Nov. 14, 2012, which claims priority to and all the advantages of French Patent Application No. 11/03644, filed on Nov. 30, 2011, the content of which is incorporated herein by reference.

The present invention concerns the technical field of electric motor ventilation systems, also known as motor-fan units, producing a flow of pulsed air and suitable in particular for use in a motor vehicle, to provide cooling for functional elements and/or the passenger compartment air-conditioning of the vehicle.

In general, a motor-fan unit comprises a shell casing which is closed at least partly by a support casing, to form a ventilation compartment comprising at least one air inlet and at least one air outlet. The motor-fan unit also comprises an impeller arranged in the ventilation compartment to draw in a flow of air through the air inlet and expel it through the air outlet, and driven by a drive motor, in particular an electric motor, arranged in a motor housing of the support casing.

Such a motor-fan unit is generally placed in a heating, ventilation and/or air-conditioning housing arranged below a dashboard, in a portion situated inside the passenger compartment of the vehicle and separated from the engine compartment, within which is the vehicle's propulsion unit. The position of the heating, ventilation and/or air-conditioning housing inside the passenger compartment necessitates a reduction in operating noise, and in particular the noise resulting from vibration caused by rotation of the drive motor of the motor-fan unit.

To this end, it is known to use a motor mount integrating a motor housing and arranged in the support casing. The motor mount comprises a seat fitted with fixing means on an element of the motor-fan unit. The motor mount also comprises a receptacle situated at least partly inside the seat and comprising a peripheral wall forming the motor housing, allowing accommodation of the drive motor. The motor mount finally comprises decoupling means interposed between the seat and the receptacle, and ensuring the connection between the receptacle and the seat. The decoupling means limit or even prevent the transmission of vibrations from the drive motor while ensuring a reliable and durable support of the receptacle.

In order to allow cooling of the drive motor, it is provided to extract a cooling air flow from the ventilation compartment, in particular upstream of the impeller following the direction of air flow in the ventilation compartment, and to conduct the cooling air flow to the motor mount. Thus the seat of the motor mount comprises at least one cooling opening for the circulation of the cooling air flow, and the receptacle comprises at least one cooling aperture for the circulation of the cooling air flow towards the motor housing. The combination of the cooling aperture and the cooling opening allows at least part of the cooling air flow extracted from the ventilation compartment to reach the drive motor.

During use, a need has been found to optimize the cooling of the drive motor, to increase the ventilation performance of the motor-fan unit, and to limit the transmission of vibrations from the drive motor.

In order to achieve this objective, the invention proposes a motor mount for a drive motor of an impeller of the motor-fan unit, comprising:
- a seat comprising at least one cooling opening for the circulation of a cooling air flow for the motor, and optionally means for fixing to an element of the motor-fan unit, and
- a receptacle situated at least partly inside the seat and comprising a peripheral wall forming an accommodation housing for the drive motor, the peripheral wall comprising at least one cooling aperture for the circulation of the cooling air flow to the motor accommodation housing.

According to the invention, the motor mount also comprises at least one cooling sleeve connecting the cooling opening and the cooling aperture. Advantageously, the cooling sleeve is made of a flexible material able to hinder the transmission of vibrations of the drive motor from the receptacle to the seat.

The use of the cooling sleeve connecting the cooling opening to the cooling aperture allows a good conduction of the cooling air flow towards the motor accommodation housing in order to ensure effective cooling. The cooling sleeve in fact prevents the cooling air flow from diffusing into the space separating the seat and the receptacle, and escaping towards the ventilation compartment or towards the exterior without passing through the motor accommodation housing.

Furthermore, the use of the cooling sleeve allows a reduction in the cooling air flow taken from the ventilation compartment insofar as the cooling sleeve guarantees that the majority of the cooling air flow is conducted towards the accommodation housing and the motor it contains. Also, the cooling sleeve is adapted to hinder the transmission of vibrations from the receptacle to the seat, in a manner which does not affect the mechanical vibrational decoupling between the seat and the receptacle ensured by the decoupling means.

According to one embodiment of the invention, each cooling aperture is situated substantially opposite a cooling opening. This positioning of the cooling aperture in relation to the cooling opening allows the use of a substantially rectilinear or straight cooling sleeve, limiting the load losses and not reducing the efficiency of the cooling air flow.

According to another variant of the invention, the cooling sleeve has a passage section of substantially constant form between the cooling aperture and the corresponding cooling opening. The constant nature of the passage section also allows limitation of load losses and contributes to the good ventilation performance of the conduction of the cooling air flow towards the motor accommodation housing.

According to the invention, the cooling sleeve may be produced in any manner and made of any appropriate material insofar as it hinders the transmission of vibrations from the receptacle to the seat, while presenting a mechanical resistance to the vibrations and temperature conditions to which it is exposed. The embodiment of the sleeve must preferably enable it to retain its structural and functional integrity after long periods of continuous operation interrupted by long periods of stoppage of the motor-fan unit containing the motor mount according to the invention.

Thus the cooling sleeve may be made of a natural or synthetic elastomer material. The cooling sleeve may also be made of a polymer material selected from the following materials:

elastomers
SEBS (styrene-ethylene-butadiene-styrene)
EPDM (ethylene-propylene-diene)
silicone
flexible PUR (polyurethane), etc.

According to a variant of the invention, the motor mount comprises decoupling means arranged between the seat and the receptacle in order to ensure a connection between the receptacle and the seat.

According to this variant, the cooling sleeve and the decoupling means are preferably made of the same material.

According to another variant of the invention, the cooling sleeve is directly connected to at least some of the decoupling means.

In the context of the latter two variants, taken separately or in combination, the decoupling means and the cooling sleeve may belong to the same molding, in particular of elastomer. Such an embodiment allows a reduction in the cost of production of the decoupling means and the cooling sleeve, and facilitates the mounting of the resulting assembly so as to limit the assembly cost of the motor mount according to the invention.

According to one embodiment of the invention, the cooling sleeve forms a decoupling element between the receptacle and the seat. This integration of the cooling sleeve in the decoupling means allows a reduction in the costs of production of the motor mount according to the invention.

According to a variant of the invention, the seat comprises a peripheral shoulder resting on the ventilation compartment. The use of such a peripheral support shoulder allows optimization of the seal between the motor mount and the element of the motor-fan unit on which the motor mount is fixed.

The invention also concerns a motor-fan unit with:
a ventilation compartment comprising at least one air inlet and at least one air outlet,
an impeller arranged in the ventilation compartment to draw in an air flow through the air inlet and expel it through the air outlet,
a drive motor for the impeller, advantageously electric, arranged in the accommodation housing of the drive motor, and
a motor mount according to the invention, of which in particular the seat is fixed to the ventilation compartment.

Naturally, different variants and/or embodiments of the invention may be associated with each other in various combinations insofar as they are not incompatible or exclusive of each other.

Figure 4:
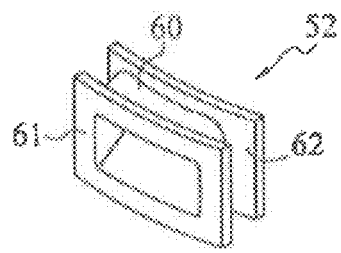
Figure 2:
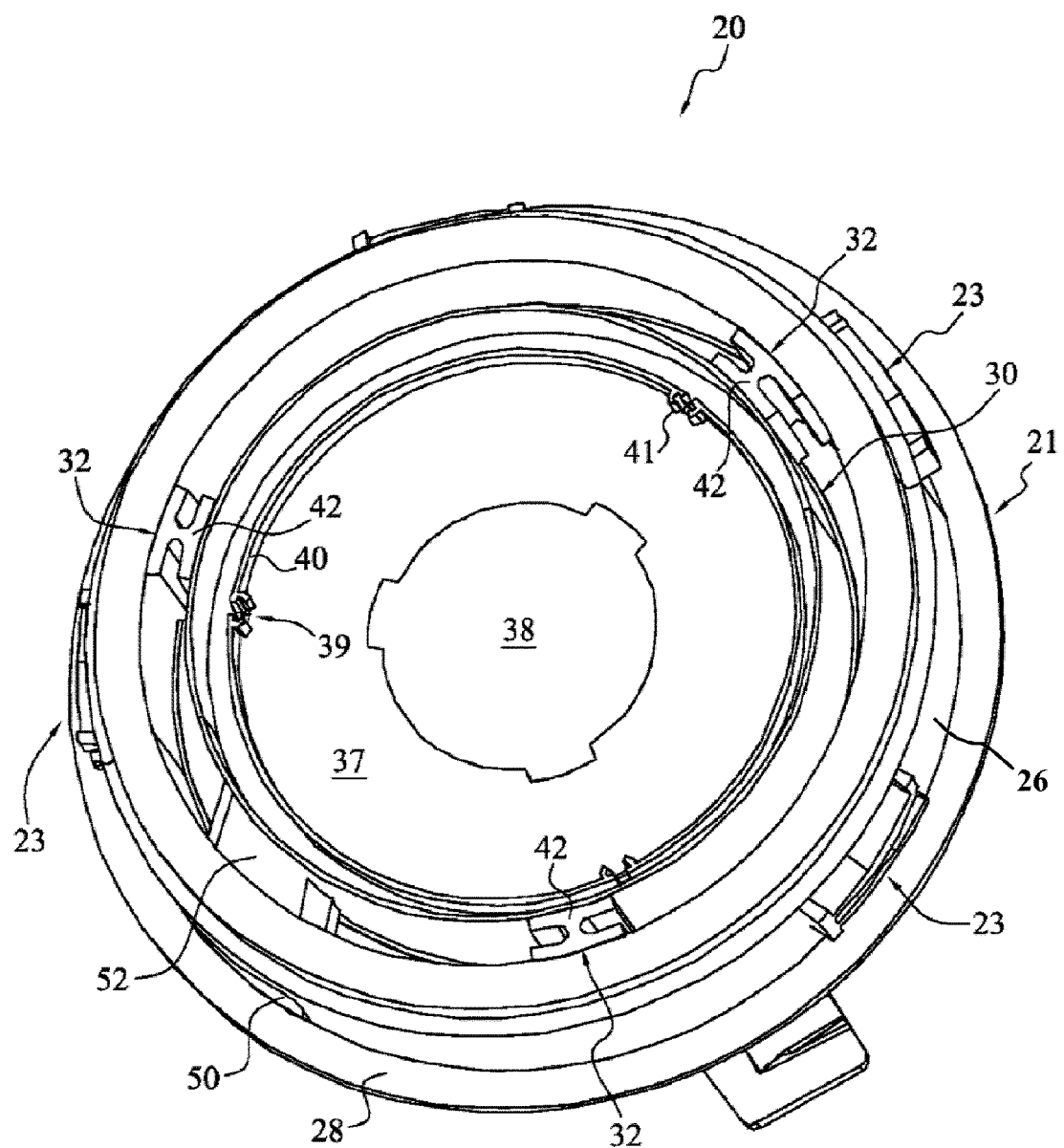
Figure 3:
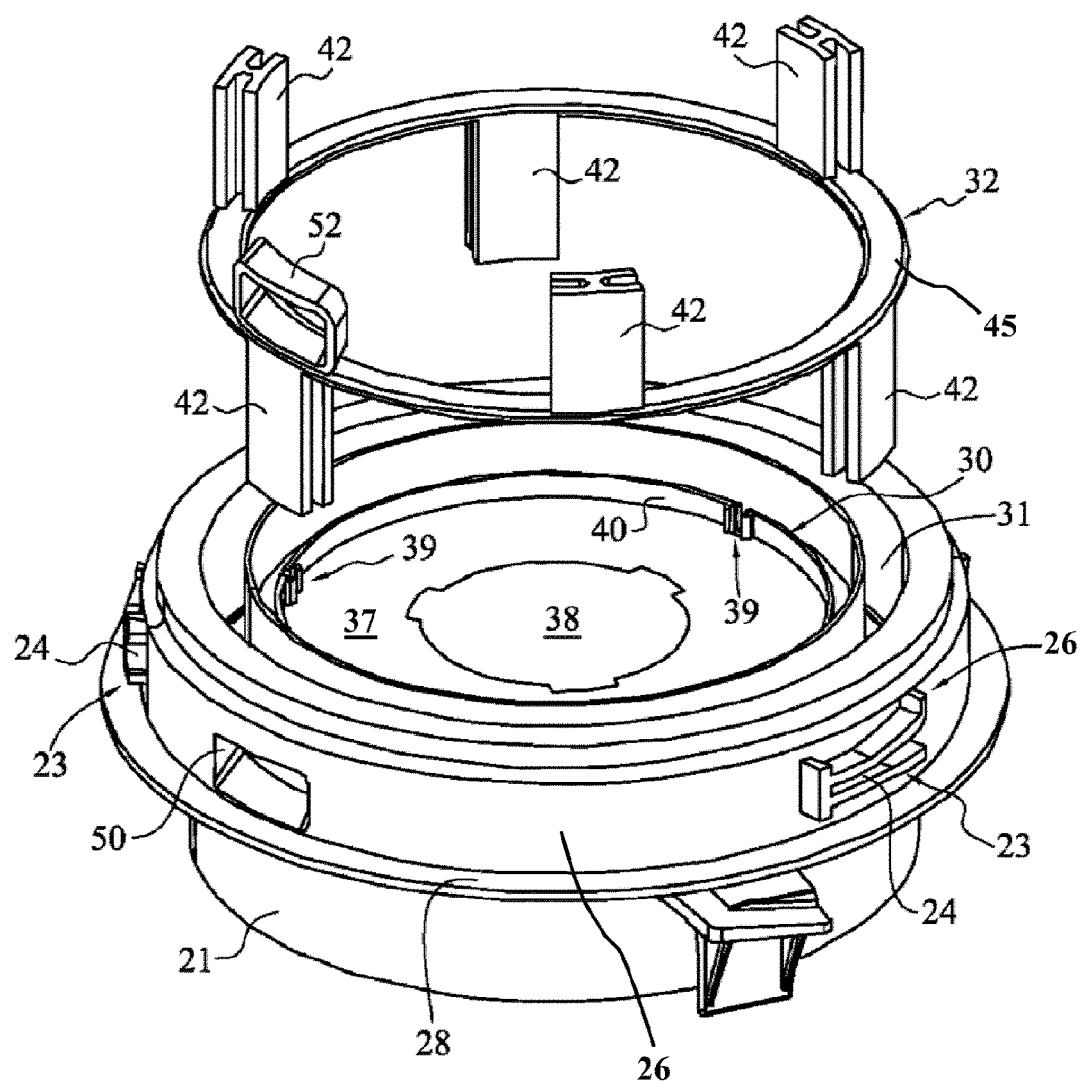

The present invention will be better understood and other characteristics and advantages will appear from reading the detailed description below concerning embodiments given as illustration with reference to the attached drawings, presented as non-limitative examples, which may serve to improve understanding of the present invention and the explanation of its embodiment, and where applicable contribute to its definition. In the drawings:

FIG. 1 is a transverse diagrammatic section of a motor-fan unit according to the present invention, FIG. 2 is a diagrammatic perspective view of a motor mount of the motor-fan unit according to the present invention, FIG. 3 is a partially exploded, diagrammatic, perspective view of the motor mount of FIG. 2, and FIG. 4 is a perspective view of a variant embodiment of a cooling sleeve forming a decoupling element of the motor mount of the present invention.

It should be noted that on the figures, structural and/or functional elements common to the various embodiments may carry the same references. Therefore, unless specified otherwise, these elements have identical structural, dimensional and material properties.

FIG. 1 is a diagrammatic cross-section of a motor-fan unit 1 according to the present invention. The motor-fan unit 1 comprises a shell casing 2, which is at least partly closed by a support casing 3 to form a ventilation compartment 4 which comprises at least one air inlet 5 and at least one air outlet 6.

An air flow within the ventilation compartment 4 is set in motion by an impeller 15 arranged inside the ventilation compartment 4. The impeller 15 is securely fixed to a drive shaft 16, extending along a longitudinal axis forming a rotation axis, of a drive motor 17, preferably an electric motor 17. The drive motor 17 allows the impeller 15 to be driven in rotation. The drive motor 17 is supported by a motor mount 20 fixed to the support casing 3. Advantageously, the motor mount 20 is assembled directly in the support casing 3.

More particularly, the diagrammatic cross-section in FIG. 1 is produced in a plane containing the drive shaft 16 of the drive motor 17.

FIG. 2 is a diagrammatic perspective view of the motor mount 20 of the motor-fan unit 1 according to the present invention. As shown more particularly on FIG. 2, the motor mount 20 comprises a seat 21. According to the example illustrated, the seat 21 has a substantially annular general form, preferably with an axis of symmetry Δ. Advantageously, the axis of symmetry Δ of the seat 21 is substantially coincident with the longitudinal axis of the drive shaft 16. The seat 21 is placed in a motor housing 22 of the support casing 3.

The motor housing 22 is for example formed by an opening 22, advantageously substantially circular, complementary in shape to the seat 21. The motor housing 22 opens into the ventilation compartment 4.

To allow fixing of the motor mount 20 to the support casing 3, the seat 21 comprises fixing means 23 which may be produced in any appropriate fashion. In the example shown, the fixing means 23 are of the bayonet type and comprise a series of grooves 24, preferably U-shaped and three in number, visible on FIG. 3, extending protruding from an outer peripheral wall 26 of the seat 21. The grooves 24 are intended to cooperate each with locking tabs 27 arranged on the support casing 3, in particular at the level of the motor housing 22.

In the example shown, the seat 21 also comprises a peripheral shoulder 28 which comes to rest against an outer face of the ventilation compartment 4, preferably formed by the support casing 3. The peripheral shoulder 28 helps ensure the seal of the ventilation compartment 4 at the level of the motor housing 22 of the support casing 3.

The motor mount 20 also comprises a receptacle 30 accommodating the drive motor 17. The drive motor 17 is arranged in the receptacle 30 so as to be immobilized and held therein. The receptacle 30 is arranged inside a central housing 31 of the seat 21 and is fixed to the seat 21 by decoupling means 32, partly visible on FIGS. 1 and 2. The decoupling means 32 are interposed between the seat 21 and the receptacle 30, being situated in the central housing 31.

The receptacle 30 comprises a peripheral wall 35 defining an accommodation housing 36 for the drive motor 17. The accommodation housing 36 is partly closed by at least one holding element 37 intended to offer support to the drive motor 17 as shown in FIG. 1. The accommodation housing 36 advantageously comprises two holding elements 37 arranged on either side of the drive motor 17.

According to the exemplary embodiment shown in FIG. 1, the holding element 37 is arranged on the side of the drive shaft 16 of the drive motor 17, and has a central opening 38 intended to allow the passage of the drive shaft 16 of the drive motor 17.

The receptacle 30 optionally comprises fixing means 39, visible on FIG. 2, which allow the drive motor 17 to be immobilized in the accommodation housing 36. The fixing means 39 may be made in any appropriate manner. According to the example shown, the fixing means 39 are formed by ribs 40 comprising notches 41 intended to receive complementary fixing elements, not shown on the figures, arranged on the drive motor 17.

The decoupling means 32 allow the creation of a so-called flexible link between the receptacle 30 and seat 21, so as to limit or even prevent the transmission of vibrations generated by the drive motor 17, in operation, to the seat 21.

The decoupling means 32 may be produced in any appropriate fashion. In the example shown, the decoupling means 32 comprise six studs 42 made of a flexible plastic material, preferably a natural or synthetic elastomer. Preferably, the six studs 42 are arranged on two separate planes, being offset angularly in relation to each other.

In order to facilitate assembly, the decoupling means 32 are preferably produced to belong to a single piece, in particular a single molding, more particularly visible in FIG. 3, which is a perspective, partially exploded, diagrammatic view of the motor mount 3 of FIG. 2.

According to the configuration shown, the decoupling means 32 are securely fixed to a ring 45 which carries on an upper face three decoupling studs 42 placed at intervals of 120° to each other, and on a lower face three decoupling studs 42 placed at intervals of 120° to each other. Furthermore, advantageously, the three decoupling studs 42 arranged on the lower face of the ring 45 are also offset by 60° in relation to the decoupling studs 42 arranged on the upper face of the ring 45.

In order to allow a cooling of the drive motor 17, the seat 21 comprises a cooling opening 50. According to the example illustrated, the cooling opening 50 opens into the ventilation compartment 4 in order to extract a cooling air flow. Advantageously, the cooling air flow is under positive pressure when the impeller 15 is in a rotational movement. Naturally, another arrangement of the cooling opening 50 could be considered, in particular as a function of the shape of the support housing 3.

Still with the aim of ensuring cooling of the drive motor 17, the receptacle 30, and more particularly the peripheral wall 35 of the receptacle 30, comprises a cooling aperture 51 allowing the passage of the cooling air flow into the accommodation housing 36. According to the example illustrated, the cooling aperture 51 of the receptacle 30 is situated substantially opposite the cooling opening 50 of the seat 21.

In order to allow a direct passage of the cooling air flow from the cooling opening 50 to the cooling aperture 51, the motor mount 20 comprises a cooling sleeve 52 connecting the cooling opening 50 to the cooling aperture 51. The use of the cooling sleeve 52 thus prevents the cooling air flow from diffusing into the space separating the seat 21 and the receptacle 30, without reaching the accommodation housing 35.

The cooling sleeve 51 is made of a flexible material adapted to hinder the transmission of vibrations from the receptacle 30 to the seat 21 when the drive motor 17 is in operation. The cooling sleeve 51 is preferably made of the same material as the decoupling means 42, such as an elastomer material.

The form of the cooling sleeve 51, and in particular the wall thickness, is then selected so as not to disrupt the behavior of the decoupling means 32.

According to the example shown, the cooling sleeve 51 has a passage section of substantially constant form over its entire length between the cooling opening 50 and the cooling aperture 51. In the present case, the passage section of the cooling sleeve 51 has a substantially rectangular form, similar to that of the cooling opening 50 and the cooling aperture 51. The cooling sleeve 51 thus defines a tubular channel conducting the cooling air flow.

Arranged in this manner, the opening 50, the sleeve 52 and the aperture 51 define a cooling air flow circulation channel extending in a straight direction, substantially radially in relation to the rotation axis 16 of the drive motor 17. Naturally, another configuration could be adopted, depending on the general shape of the motor-fan unit 1 and in particular the ventilation compartment 4, in particular the support casing 3.

To facilitate assembly, the cooling sleeve 51 is preferably but not necessarily connected directly to at least some of the decoupling means 32, as shown in FIG. 3. According to the exemplary embodiment shown, the cooling sleeve 52 is carried by the upper face of the ring 45 and forms an integral part of the same molding as the decoupling studs 42.

According to the example described above, the cooling sleeve 52 is separate from the decoupling means 32. However, according to the present invention, the cooling sleeve 52 may also be integrated in the decoupling means 32.

FIG. 4 is a perspective view of a variant embodiment of the cooling sleeve 52 forming a decoupling element of the motor mount 20 of the present invention.

FIG. 4 therefore shows an exemplary embodiment in which the cooling sleeve 52 forms a decoupling element 32 for fixing the receptacle 30 to the seat 21. According to this variant, the cooling sleeve 52 comprises a tube 60 integrating at one end a first fixing plate 61 on the seat 21. Advantageously, the first fixing plate 61 is rectangular. At the opposite end, the tube 60 has a second fixing plate 62 on the receptacle 30. Advantageously, the second fixing plate 62 is rectangular.

According to the preceding examples, the seat 21 and the receptacle 30 respectively comprise a single cooling opening 50 and a single cooling aperture 51. However, the seat 21 and the receptacle 30 may comprise several cooling openings 50 and several cooling apertures 51 respectively, wherein it is understood that there are the same number of cooling openings 50 as cooling apertures 51. The motor mount 20 then comprises as many cooling sleeves 52 as there are pairs of cooling openings 50/cooling apertures 51.

Naturally, the invention is not limited to the embodiments described above which are given merely as examples. It includes various modifications, alternative forms and other variants which the person skilled in the art could consider in the context of the present invention, and in particular all combinations of the different operating modes described above which may be taken separately or in association.

The invention claimed is:

1. A motor mount (20) for a drive motor (17) of an impeller (15) of a motor-fan unit (1), the motor mount (20) comprising:
   a seat (21) including a peripheral shoulder (28) which rests against an outer face of a support casing (3) forming a ventilation compartment (4), fixing means

(23) to allow fixing of the motor mount (20) to the support casing (3), and at least one cooling opening (50) for circulation of a cooling air flow for the drive motor (17), and a receptacle (30) situated at least partly inside the seat (21) and comprising a peripheral wall (35) forming an accommodation housing (36) for the drive motor (17), the peripheral wall (35) including at least one cooling aperture (51) for the circulation of the cooling air flow through the accommodation housing (36), wherein the motor mount (20) comprises at least one cooling sleeve (52) connecting the cooling opening (50) and the cooling aperture (51).

2. The motor mount (20) as claimed in claim 1, wherein the cooling aperture (51) is situated substantially opposite the cooling opening (50).

3. The motor mount (20) as claimed in claim 1, wherein the cooling sleeve (52) has a passage section of substantially constant cross-section between the cooling aperture (51) and the cooling opening (50).

4. The motor mount (20) as claimed in claim 1, wherein the cooling sleeve (52) is made of elastomer material.

5. The motor mount (20) as claimed in claim 1, wherein the motor mount (20) includes decoupling means (32) arranged between the seat (21) and the receptacle (30) and connecting the receptacle (30) to the seat (21).

6. The motor mount (20) as claimed in claim 5, wherein the cooling sleeve (52) is made of the same material as the decoupling means (32).

7. The motor mount (20) as claimed in claim 5, wherein the cooling sleeve (52) is directly connected to the decoupling means (32).

8. The motor mount (20) as claimed in claim 5, wherein the decoupling means (32) and the cooling sleeve (52) are integral.

9. The motor mount (20) as claimed in claim 1, wherein the cooling sleeve (52) is disposed between the receptacle and the seat (21).

10. A motor-fan unit (1) with a ventilation compartment (4) comprising at least one air inlet (5) and at least one air outlet (6), an impeller (15) arranged in the ventilation compartment (4) to draw in an air flow through the air inlet (5) and expel the air flow through the air outlet (6), the drive motor (17) for the impeller (15) arranged in the accommodation housing (36) of the drive motor (17), and the motor mount (20) as claimed in claim 1.

11. The motor mount (20) as claimed in claim 2, wherein the cooling sleeve (52) has a passage section of substantially constant cross-section between the cooling aperture (51) and the cooling opening (50).

12. The motor mount (20) as claimed in claim 2, wherein the motor mount (20) includes decoupling means (32) arranged between the seat (21) and the receptacle (30) and connecting the receptacle (30) to the seat (21).

13. The motor mount (20) as claimed in claim 6, wherein the cooling sleeve (52) is directly connected to the decoupling means (32).

* * * * *